(No Model.)
C. KLEIN.
SAW BUCK.
No. 321,823. Patented July 7, 1885.
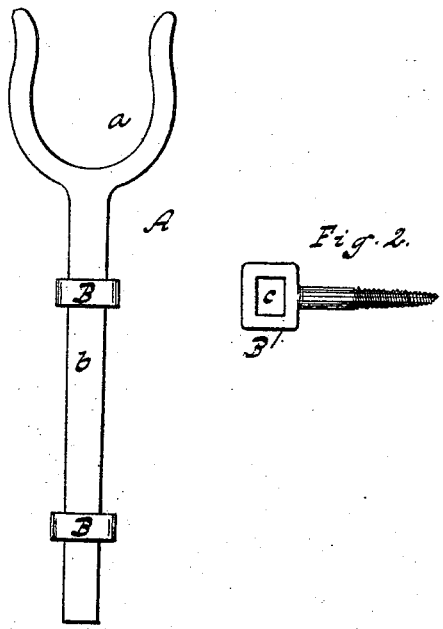
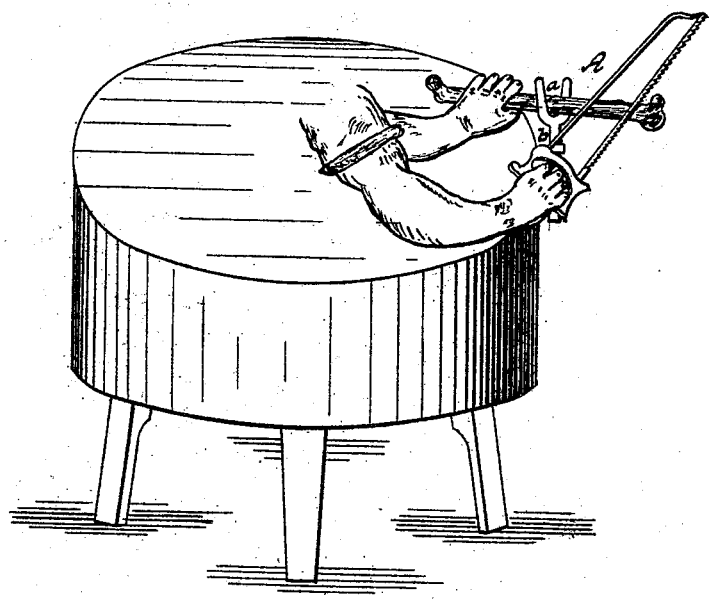
WITNESSES:
INVENTOR
Carl Klein
BY

United States Patent Office.

CARL KLEIN, OF NEW YORK, N. Y.

SAW-BUCK.

SPECIFICATION forming part of Letters Patent No. 321,823, dated July 7, 1885.

Application filed May 7, 1885. (No model.)

*To all whom it may concern:*

Be it known that I, CARL KLEIN, a citizen of the United States, residing at New York, in the county and State of New York, have invented new and useful Improvements in Saw-Bucks, of which the following is a specification.

My invention consists in a saw-buck composed of a yoke provided with a suitable shank and fastenings constructed to receive and prevent the shank from turning, all of which is more fully pointed out in the following specification and claims, and illustrated in the accompanying drawings, in which—

Figure 1 is a face view of my improved saw-buck. Fig. 2 is a plan view of one of the fastenings. Fig. 3 is a perspective showing the saw-buck in use.

Similar letters indicate corresponding parts.

In the drawings the letter A designates my saw-buck, which consists of a yoke, $a$, and a shank, $b$, cast integral and of any material possessing the rigidity required for the purpose. The shank $b$ in the example shown in the drawings is of a rectangular cross section, and two of its sides are made slightly tapering toward its bottom end, and said shank is firmly held in position by screws, B, having suitable sockets, $c$, which receive the shank and prevent the same from turning. I do not, however, restrict myself to a shank having a square or rectangular cross-section, as a round shank and corresponding sockets can be used; but with such a shank it is necessary to key the shank in position in order to prevent it from turning.

I have designed this saw-buck more especially for butchers' use in sawing bones in order to obtain the marrow contained therein, and its simplicity renders it very adaptable for that purpose. Since the shank is taper, it firmly wedges itself into its sockets, and is not liable to come out while in use; but at the same time the yoke and shank can easily be tapped out when so desired.

What I claim as new, and desire to secure by Letters Patent, is—

1. A saw-buck consisting of a yoke provided with a suitable shank, and fastenings constructed to receive the shank and to prevent it from turning, substantially as shown and described.

2. The combination, with the yoke and the taper shank thereof, of socketed fastenings adapted to receive the shank, substantially as shown and described.

In testimony whereof I have hereunto set my hand and seal in the presence of two subscribing witnesses.

CARL KLEIN. [L. S.]

Witnesses:
W. HAUFF,
A. FABER DU FAUR, Jr.